(12) United States Patent
Sonobe

(10) Patent No.: US 10,512,137 B2
(45) Date of Patent: Dec. 17, 2019

(54) LED DRIVE CIRCUIT

(71) Applicant: FUJI ELECTRIC CO., LTD., Kawasaki-shi (JP)

(72) Inventor: Koji Sonobe, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 201 days.

(21) Appl. No.: 14/078,784

(22) Filed: Nov. 13, 2013

(65) Prior Publication Data

US 2014/0062333 A1 Mar. 6, 2014

Related U.S. Application Data

(63) Continuation of application No. PCT/JP2012/052839, filed on Feb. 8, 2012.

(30) Foreign Application Priority Data

Jun. 9, 2011 (JP) .................................. 2011-129336

(51) Int. Cl.
*H05B 37/02* (2006.01)
*H05B 33/08* (2006.01)
(Continued)

(52) U.S. Cl.
CPC ........ *H05B 37/02* (2013.01); *H02M 3/33507* (2013.01); *H05B 33/0815* (2013.01);
(Continued)

(58) Field of Classification Search
None
See application file for complete search history.

(56) References Cited

U.S. PATENT DOCUMENTS 8,633,613 B2   1/2014 Wanner et al.
2007/0138971 A1* 6/2007 Chen .................. H05B 39/045
                                                 315/209 R
(Continued)

FOREIGN PATENT DOCUMENTS

CN      2805207 Y    8/2006
CN    101282088 A   10/2008
(Continued)

OTHER PUBLICATIONS

Office Action issued in CN201280023510.X, dated May 12, 2015. English translation provided.
(Continued)

*Primary Examiner* — Jimmy T Vu
*Assistant Examiner* — Laura Yesildag
(74) *Attorney, Agent, or Firm* — Rossi, Kimms & McDowell LLP

(57) ABSTRACT

In aspects of the invention, a flyback converter configuration LED drive circuit, by adopting a configuration such that anode voltages of LEDs smoothed by a smoothing capacitor on the secondary side of a transformer and a terminal of a drive IC circuit are used as a node common. Current can be supplied to the primary side of the smoothing capacitor by a start-up circuit when starting, the need for an auxiliary winding, smoothing capacitor, and rectifier diode which have heretofore been necessary to supply a power source to the drive IC circuit is eliminated. Consequently, the number of parts can be reduced, meaning that the configuration of the LED drive circuit becomes simple, thus enabling a reduction in size and cost of the LED drive circuit.

3 Claims, 8 Drawing Sheets

(51) Int. Cl.
*H02M 3/335* (2006.01)
*H02M 1/36* (2007.01)
*H02M 1/00* (2006.01)

(52) U.S. Cl.
CPC ........... *H05B 33/0845* (2013.01); *H02M 1/36* (2013.01); *H02M 2001/0006* (2013.01)

(56) References Cited

U.S. PATENT DOCUMENTS

| | | | |
|---|---|---|---|
| 2009/0237965 A1* | 9/2009 | Sonobe | H02M 1/36 363/49 |
| 2010/0109571 A1 | 5/2010 | Nishino et al. | |
| 2010/0117538 A1 | 5/2010 | Fujino | |
| 2010/0142229 A1* | 6/2010 | Chen | H02M 3/33592 363/21.02 |
| 2010/0213857 A1* | 8/2010 | Fan | H05B 33/0827 315/186 |
| 2011/0025225 A1 | 2/2011 | Horiuchi et al. | |
| 2011/0043133 A1 | 2/2011 | Van Laanen et al. | |
| 2012/0056551 A1 | 3/2012 | Zhu et al. | |
| 2012/0187863 A1* | 7/2012 | Nonaka et al. | 315/291 |

FOREIGN PATENT DOCUMENTS

| | | |
|---|---|---|
| CN | 201388313 Y | 1/2010 |
| CN | 101742783 A | 6/2010 |
| CN | 101951177 A | 1/2011 |
| CN | 102017381 A | 4/2011 |
| JP | 55-053182 A | 4/1980 |
| JP | 2008-278640 A | 11/2008 |
| JP | 2009-232624 A | 10/2009 |
| JP | 2011-035112 A | 2/2011 |
| WO | 2008-093692 A1 | 8/2008 |

OTHER PUBLICATIONS

Extended European Search Report issued in EP12796951.7, dated Oct. 12, 2015.

* cited by examiner

LED DRIVE CIRCUIT

CROSS-REFERENCE TO RELATED APPLICATIONS

This application is a continuation of International Application No. PCT/JP2012/052839, filed on Feb. 8, 2012, which is based on and claims priority to Japanese Patent Application No. JP 2011-129336, filed on Jun. 9, 2011. The disclosure of the Japanese priority application and the PCT application in their entirety, including the drawings, claims, and the specification thereof, are incorporated herein by reference.

BACKGROUND

1. Field of the Invention

Embodiments of the invention relates to an LED drive circuit which converts an alternating current commercial power source to a direct current voltage necessary to cause light emitting diodes (hereafter referred to as "LEDs") to emit light, and controls lighting of the LEDs, and particularly, relates to an LED drive circuit wherein the need for an auxiliary winding of a transformer, a current limiting resistor thereof, a rectifier diode, a smoothing capacitor, or the like, which has heretofore been provided in order to supply the power source to a control circuit in the LED drive circuit is eliminated.

2. Related Art

Among lighting units using an LED bulb, there is a lighting unit which is lighted using a commercial power source. When lighting of this kind of lighting unit is controlled, a flyback converter configuration LED drive circuit is generally used to generate a direct current voltage which drives LEDs using the commercial power source and an AC-DC converter.

FIG. 6 is a circuit diagram showing one example of a heretofore known flyback converter configuration LED drive circuit.

The LED drive circuit shown here is a circuit for generating a desired direct current output voltage Vout from a commercial power source voltage of an AC power source 1 and driving LEDs 51 to 53. The LED drive circuit is configured including a diode bridge rectifier circuit 2, an alternating current switch 3, an inductor Lin and capacitor C1 configuring an input filter circuit, two smoothing capacitors C2 and C3, a phase compensation capacitor Ccomp, a switching element M1, a drive IC circuit 4 which on/off controls the switching element M1, a sensing resistor R1, a current sensing resistor R2, a current limiting resistor R3, two rectifier diodes D1 and D2, and a transformer T.

Also, an internal circuit configuration of the drive IC circuit 4 is shown in FIG. 7. The drive IC circuit 4 includes a VCC terminal 41, a VH terminal 42, an IS terminal 43, an FB terminal 44, a COMP terminal 45, an OUT terminal 46, and a GND terminal 47, and a main circuit section of the drive IC circuit 4 is mainly configured including a start-up circuit 10 and a pulse control circuit 20.

The start-up circuit 10 is configured of a low-voltage malfunction protection circuit (hereafter referred to as an UVLO) 11, a reference voltage source 12 which supplies two differing threshold voltages to the UVLO 11 as an UVLO cancel voltage Vref1 and UVLO voltage Vref2 (note that Vref1>Vref2), a junction field effect transistor (JFET) 13, a current source circuit 14 which generates a starting current Ist, a switch 15, and an inverter circuit 16.

Herein the drain of the junction field effect transistor (hereafter referred to as the JFET) 13 is connected to the high-voltage VH terminal 42, and the source is connected to one end of the switch 15 via the current source circuit 14. Also, the gate of the JFET 13 is connected to the ground. The JFET 13 is such that the higher the source potential thereof than the gate potential, the lower a drain current. Consequently, when the source potential is too high, only a current still lower than a current defined by the current source circuit 14 flows.

The pulse control circuit 20 is configured of an error amplifier 21, a reference voltage source 22, a comparator 23, an RS flip flop 24 (hereafter referred to as an RSFF), an oscillator 25, an AND circuit 26, and a buffer amplifier 27. In the pulse control circuit 20, the RSFF 24 is set by a fixed-cycle pulse signal output from the oscillator 25. Also, a signal (an error signal) wherein a difference between a voltage signal corresponding to a load level received at the FB terminal 44 and a reference voltage Vref output from the reference voltage source 22 is amplified by the error amplifier 21 is compared by the comparator 23 with a current sensing voltage signal Vs input into the IS terminal 43, and when the voltage signal reaches the error signal, the RSFF 24 is reset. An output signal (a Q output) from an output terminal Q of the RSFF 24 is output from the OUT terminal 46 as a pulse width modulated pulse signal via the AND circuit 26 and buffer amplifier 27. In this way, the drive IC circuit 4 is configured in such a way as to on/off control the switching element M1 using the pulse signal from the OUT terminal 46 (the switching element M1 is turned on when the Q output of the RSFF 24 is at an H (high) level).

Returning to FIG. 6, in the LED drive circuit, when the alternating current switch 3 is turned on, the commercial power source voltage of the AC power source 1 is rectified and applied to the input side of the transformer T. In the drive IC circuit 4, as the terminal voltage of the capacitor C1 connected to the high-voltage VH terminal 42 rises at this time, the starting current Ist flows from the VH terminal 42 to the VCC terminal 41 via the start-up circuit 10 which is an internal circuit of the drive IC circuit 4. That is, the start-up circuit 10 has a function of a current supply circuit which supplies current to the capacitor which starting. Because of this, it is possible to start charging of the smoothing capacitor C3 connected to the VCC terminal 41.

The drive IC circuit 4 is such that when the voltage of the VCC terminal 41 reaches the UVLO cancel voltage Vref1, of the threshold voltages of the UVLO 11, the switch 15 in the start-up circuit 10 is turned off, and the starting current Ist flowing from the VH terminal 42 to the VCC terminal 41 can be stopped.

At the same time with this, the signal from the start-up circuit 10 supplied to the AND circuit 26 switches from a previous L (low) level to an H (high) level, and the output signal of the OUT terminal 46 becomes able to be on/off controlled in response to the Q output signal of the RSFF 24. That is, the switching element M1 of the LED drive circuit, on receiving the output signal from the OUT terminal 46 of the drive IC circuit 4, repeats an on/off operation.

The switching element M1 is provided on a primary coil L1 side of the transformer T, and a voltage based on the input voltage Vin supplied to the primary coil L1 is induced on a secondary coil L2 side by the on/off operation of the switching element M1. Consequently, the voltage induced in the secondary coil L2 of the transformer T is rectified and smoothed by the secondary side rectifier diode D2 and smoothing capacitor C2, and becomes the direct current output voltage Vout, and the direct current output voltage Vout is applied to the plurality of LEDs 51 to 53 connected in series.

Herein, in order to stably cause the LEDs 51 to 53 to emit light with the direct current output voltage Vout, it is necessary to control a current flowing thereinto to be constant. The switching element M1 is turned on by the RSFF 24 being set by the signal from the oscillator 25 built into the drive IC circuit 4, and the output of the OUT terminal 46 changing from the L level to the H level. Also, the load current 10 from the secondary coil L2 and smoothing capacitor C2 flows to the LEDs 51 to 53, but is voltage converted by the current sensing resistor R2, and input into the FB terminal 44 of the drive IC circuit 4. Also, the voltage level of the COMP terminal 45 is determined by a degree of error between the voltage signal of the FB terminal 44 and the reference voltage Vref of the reference voltage source 22. That is, the error amplifier 21 being a trans-conductance amplifier, a current corresponding to the difference between the voltage signal of the FB terminal 44 and the reference voltage Vref of the reference voltage source 22 flows from the error amplifier 21 to the capacitor Ccomp connected to the COMP terminal 45, and the voltage level of the COMP terminal 45 is determined by the current being integrated by the capacitor Ccomp.

Further, when the voltage signal Vs of the IS terminal 43 reaches the voltage level of the COMP terminal 45, the RSFF 24 is reset, the output from the OUT terminal 46 changes from the H level to the L level, and the switching element M1 is turned off. Herein, when the load current 10 flowing to the LEDs 51 to 53 is lower than a set value, the on-duty of the switching element M1 becomes wider, and when the current flowing to the LEDs 51 to 53 is higher than the set value, the on-duty of the switching element M1 becomes narrower. In other words, the drive IC circuit 4 operates in such a way as to cause a certain magnitude of load current 10 to flow to the secondary coil L2 side of the transformer T, and a duty control is carried out on the LEDs 51 to 53. See Japanese patent application no. JP-A-2011-35112 (also referred to herein as "PTL 1").

The feature of this kind of heretofore known LED drive circuit is in that when the power source voltage is supplied to the drive IC circuit 4 of the LEDs 51 to 53, a coil L3 configuring an auxiliary winding with the same polarity as the secondary coil L2 is added to the transformer T, and the coil L3 is connected to the VCC terminal 41 of the drive IC circuit 4. That is, as heretofore described, when the voltage of the VCC terminal 41 reaches the UVLO cancel voltage Vref1, the switch 15 in the start-up circuit 10 is turned off, thus stopping the starting current Ist flowing from the VH terminal 42 to the VCC terminal 41, and subsequently, power is supplied to the drive IC circuit 4 by an electromotive force generated in the coil L3 configuring the auxiliary winding by the switching operation of the switching element M1. Further, the rectifier diode D1 and smoothing capacitor C3 are necessary in order to connect the coil L3 to the VCC terminal 41. Also, the voltage value of the VCC terminal 41 is determined by the turn ratio of the secondary coil L2 and coil L3, but the current limiting resistor R3 must be interposed in series with the rectifier diode D1 in order for the voltage at the VCC terminal 41 not to rise due to a surge voltage generated on the primary side of the transformer T.

With the heretofore known LED drive circuit shown in FIG. 6, in order to stably supply a power source to the drive IC circuit 4 after the start-up, not only is the auxiliary winding provided in the transformer T, apart from the drive IC circuit 4, but the rectifier diode D1, current limiting resistor R3, smoothing capacitor C3, and the like, must be additionally incorporated.

However, with regard to an LED bulb, it is necessary to fit the LED drive circuit, as well as the LED main body, in a bulb of the same size as a heretofore known incandescent bulb, and it is in general difficult to fit the LED drive circuit with a large number of parts in a limited space of the LED bulb, meaning that it is important to reduce the number of parts configuring the LED drive circuit.

FIG. 8 is a diagram showing another example of the heretofore known LED drive circuit.

In this LED drive circuit, a supply of power source to the kind of drive IC circuit 4 shown in FIG. 7 (a supply of current to a capacitor C4 connected to the VCC terminal 41) is constantly carried out via the start-up circuit 10 connected to the VH terminal 42. Because of this, it is not necessary to provide an auxiliary winding in the transformer T.

However, with this LED drive circuit, in order to stabilize the voltage supplied to the VCC terminal 41 which is a power source terminal, the high capacity capacitor C4 is necessary between the VCC terminal 41 and GND terminal 47. Also, as an arrangement is such that an operating current of the drive IC circuit 4 is supplied by supplying the high-voltage input voltage Vin directly to the VH terminal 42, there is a problem in that power consumed in the drive IC circuit 4 becomes larger.

Japanese patent application no. JP-A-2008-278640 (also referred to herein as "PTL 2") discloses an invention of a power supply and lighting unit wherein it is possible to obtain a stable internal power source, and it is possible to omit parts such as an auxiliary winding, by making the anode voltages of LEDs and the power source of a drive IC circuit common to each other.

However, with the configuration of the power supply disclosed here, no power source is supplied to a control circuit (53) unless a switching of a switching transistor (33) starts. Meanwhile, the switching of the switching transistor (33) cannot be started unless power is supplied to the control circuit (53). Consequently, there occurs a problem in that the power supply with this kind of configuration cannot start the drive IC circuit.

Also, Japanese patent application no. JP-A-2009-232624 (also referred to herein as "PTL 3") discloses an invention of a power supply and lighting unit wherein it is possible to stably light a semiconductor light emitting element by adopting a configuration such that the power source of a control circuit is supplied from the secondary side of a transformer to a drive IC circuit.

In PTL 3, as a start-up controller (28) is provided so as to enable a drive IC circuit to start, the problem of PTL 2 is solved. Herein, the start-up controller (28) is connected to a primary winding (14a) of a switching transformer (14) and, when the output of a ripple current smoothing capacitor (13) is supplied to the primary winding (14a) of the switching transformer (14) by a power source being applied, supplies a starting output to a control circuit (26) for a predetermined time. That is, the start-up controller (28), when starting, supplies power to the control circuit (26) for the predetermined time. Meanwhile, in order to cause a switching transistor (15) to switch, it is necessary to instantaneously cause a current of several hundred mA to flow in order to charge and discharge the gate capacitance of the switching transistor (15).

Consequently, the start-up controller (28) has to be able to turn on/off a current of several hundred mA, and when the start-up controller (28) is attempted to be configured of a semiconductor element, the chip size thereof is large. Also, when the chip size of the start-up controller (28) is attempted to be reduced, it is necessary to prepare a buffer capacitor, apart from the reduction in size. Moreover, a high capacity capacitor is required in order to instantaneously supply a current of several hundred mA from the buffer capacitor. In this way, with the invention of PTL 3, a cost problem occurs newly for an LED bulb power supply or that kind of lighting unit.

SUMMARY OF INVENTION

The invention, having been contrived bearing in mind these kinds of point, has an object of providing an LED drive circuit wherein by eliminating the need for a power source capacitor of a drive IC circuit for lighting an LED bulb, it is possible to reduce the size of the circuit, and to reduce cost thereof.

The invention, in order to solve the heretofore described problem, provides an LED drive circuit which converts an alternating current voltage of an alternating current power source to a direct current voltage necessary to cause light emitting diodes (hereafter referred to as LEDs) to emit light, and controls lighting of the LEDs. The LED drive circuit includes a rectifier circuit which converts the alternating current power source to a direct current; a voltage converter circuit, having a transformer to the primary side of which the direct current voltage converted by the rectifier circuit is connected and a switching element, which converts the direct current voltage converted by the rectifier circuit to a desired magnitude, and supplies it to the LEDs from the second side of the transformer; a capacitor connected to a path connecting the secondary side of the transformer and the LEDs; a control circuit which supplies a predetermined current to the LEDs by controlling the on-duty of the switching element; and a current supply circuit, connected between the rectifier circuit and the capacitor, which supplies a starting current to the capacitor, wherein the control circuit is configured so as to obtain a supply of the power source from the capacitor.

According to the invention, by adopting a configuration such that anode voltages of LEDs smoothed by a capacitor on the secondary side of a transformer and the power source terminal of a drive IC circuit are used as a common node, and current is supplied to the primary side of the capacitor by a start-up circuit when starting, the need for an auxiliary winding, smoothing capacitor, and rectifier diode which have heretofore been necessary to supply a power source to the drive IC circuit is eliminated. Consequently, the number of parts is reduced, meaning that the configuration of the LED drive circuit becomes simple, thus enabling a reduction in size and cost of the LED drive circuit.

The heretofore described and other objects, features, and advantageous effects of the invention will be clarified by the following description relating to the attached drawings illustrating preferred embodiments as examples of the invention.

DETAILED DESCRIPTION

Figure 1:
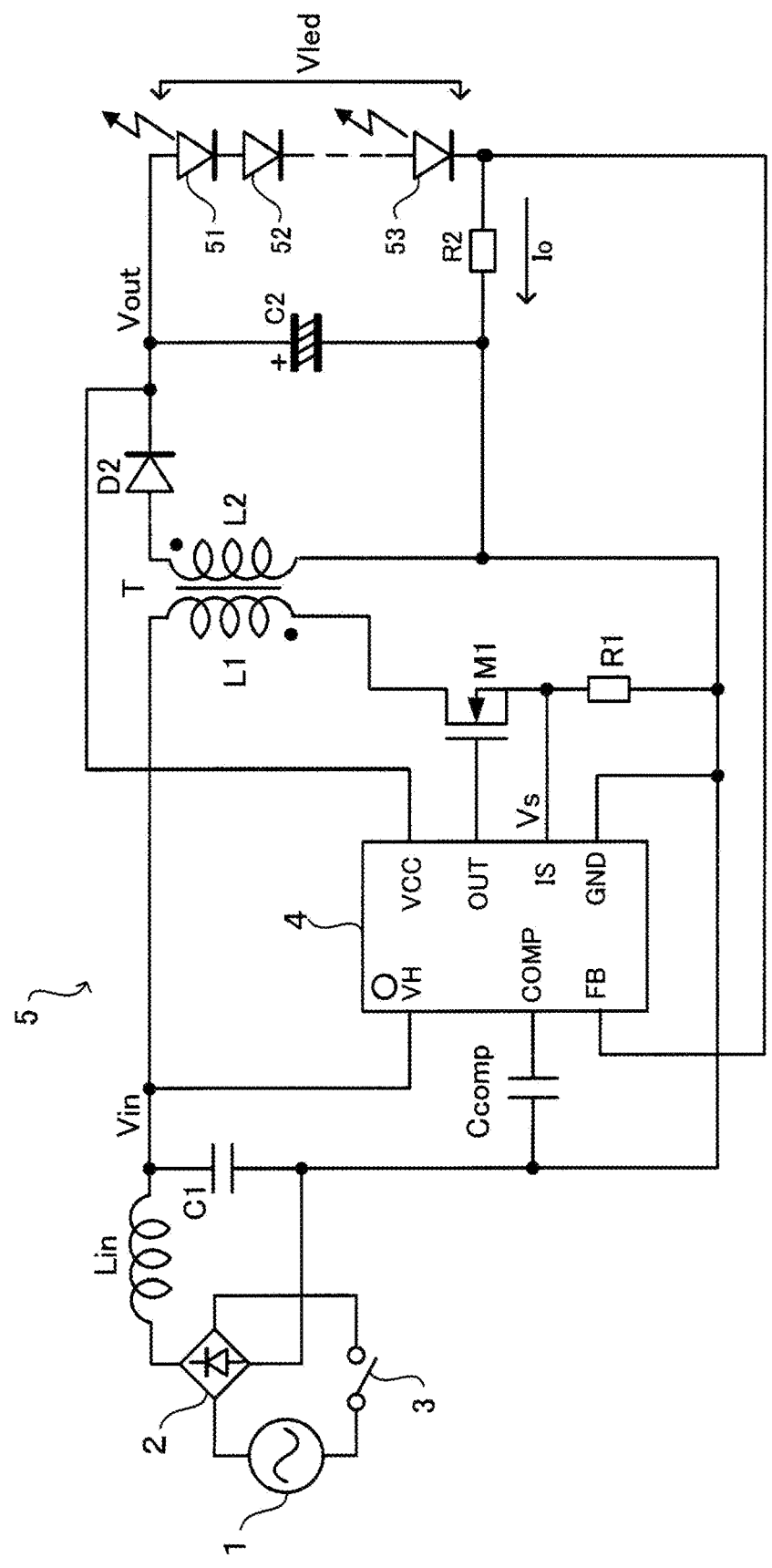
FIG. 1 is a diagram showing an LED drive circuit according to a first embodiment of the invention.

Hereafter, referring to the drawings, a description will be given of embodiments of the invention.

Figure 6:
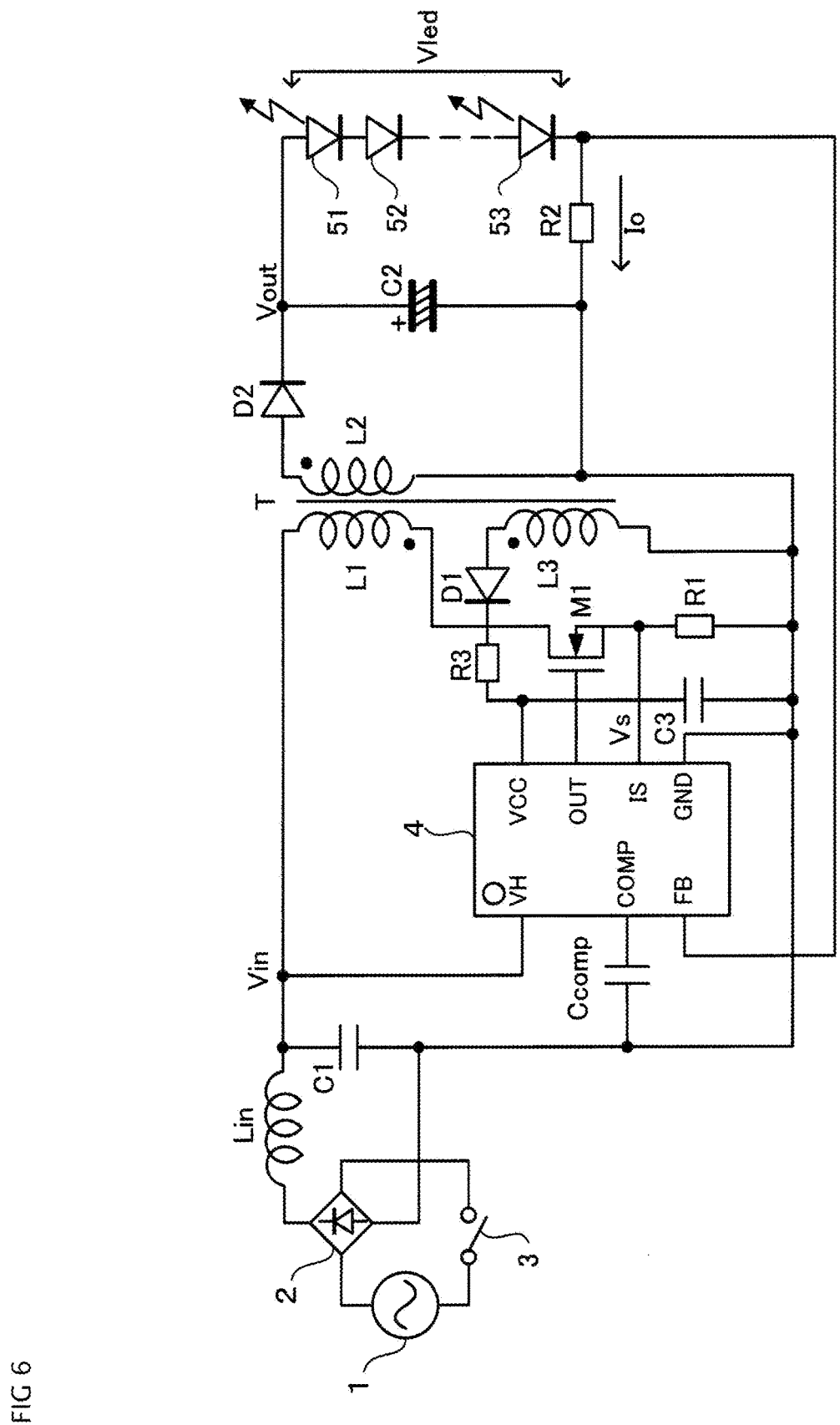
FIG. 6 is a diagram showing one example of a heretofore known flyback converter configuration LED drive circuit.

FIG. 1 is a diagram showing an LED drive circuit according to a first embodiment of the invention. Herein, circuit components corresponding to those of a heretofore known flyback converter configuration LED drive circuit shown in FIG. 6 are given the same reference numerals and signs, and a description thereof is omitted.

The LED drive circuit 5, in order to control a plurality of LEDs 51 to 53 connected in series to be constant, is configured in such a way that the ground side of a primary side circuit and secondary side circuit of a transformer T is short-circuited, and a voltage signal at a connection point of a current sensing resistor R2 with the cathode electrode of the LED 53 is fed back to an FB terminal 44 of a drive IC circuit 4.

Figure 7:
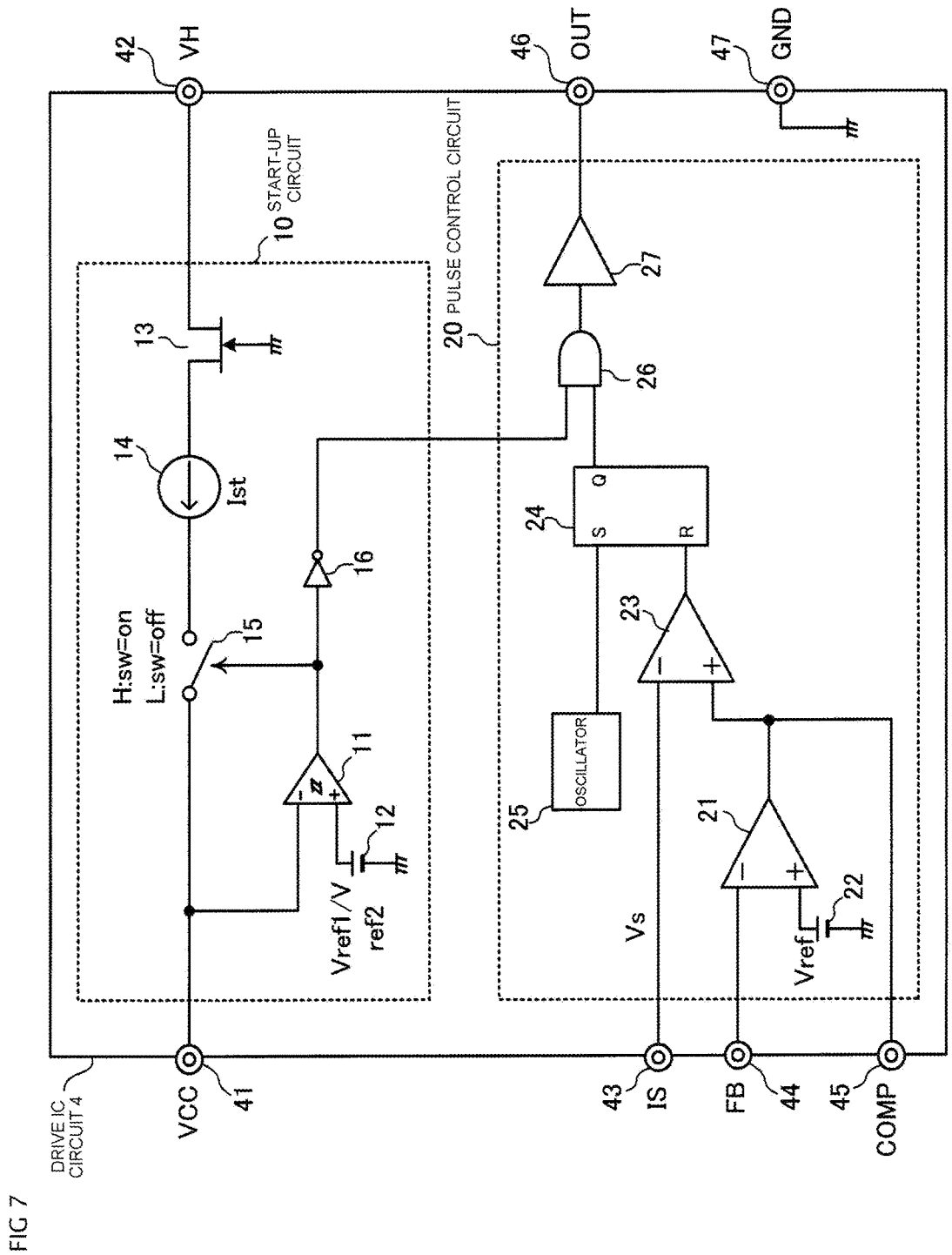
FIG. 7 is a diagram showing an internal circuit configuration of a drive IC circuit.
Figure 8:
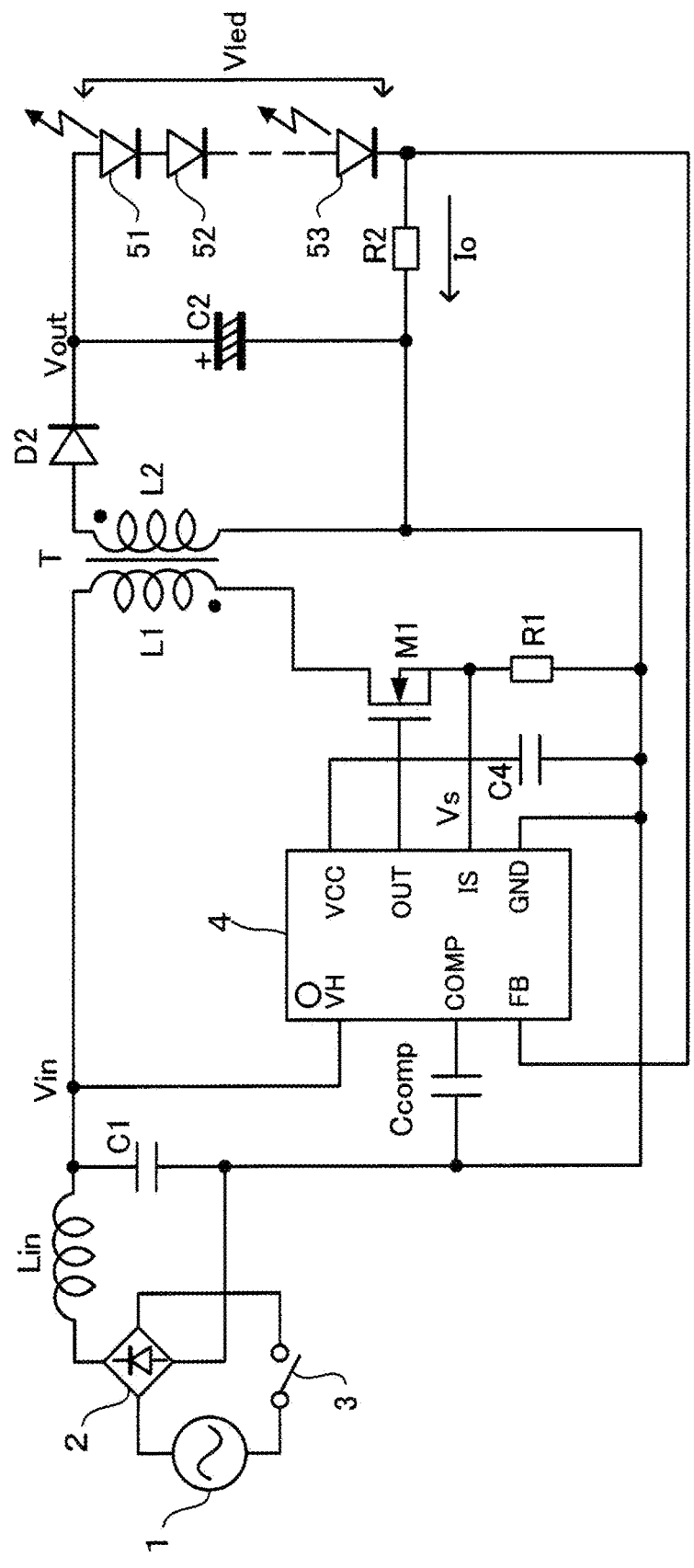
FIG. 8 is a diagram showing another example of the heretofore known LED drive circuit.

The drive IC circuit 4 is made to have the previously described internal circuit configuration shown in FIG. 7, and a VCC terminal 41 of the drive IC circuit 4 is connected to one end of a smoothing capacitor C2 provided on the secondary side of the transformer T. Thereby, anode voltages of the LEDs 51 to 53 smoothed by the smoothing capacitor C2 and the VCC terminal of the drive IC circuit 4 are used as a node common. Because of this, it is possible to supply a drive current to the drive IC circuit 4 using accumulated charge of the smoothing capacitor C2. Consequently, it is possible to eliminate the need for an auxiliary winding, a smoothing capacitor, and a rectifier diode which have heretofore been necessary to supply a power source to a drive IC circuit. As a result of this, it is possible to reduce the number of parts, and the configuration of the LED drive circuit becomes simple, thus enabling a reduction in size and cost of the LED drive circuit.

Also, when the LED drive circuit 5 is started, current is supplied to the smoothing capacitor C2 from the primary side of the transformer by a start-up circuit provided in the drive IC circuit, meaning that the voltage of the smoothing capacitor C2 rises even when no switching operation of a switching element M1 is started, and the drive IC circuit 4 acquires a power source and can start operating.

Hereafter, a description will be given, based on the timing chart of FIG. 2, of the heretofore described, as well as an operation of an alternating current switch 3 when turned on/off.

Figure 2:
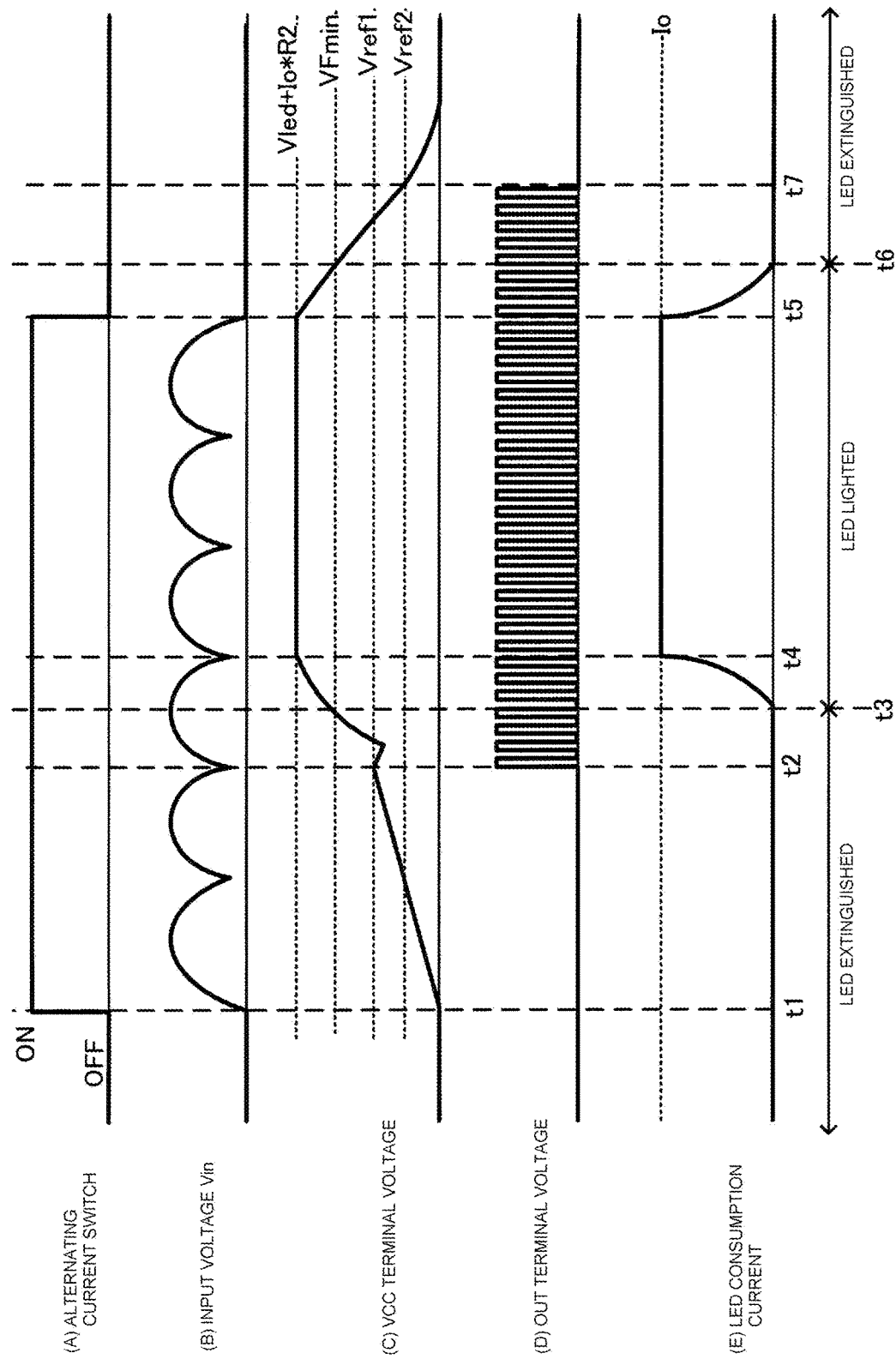
FIG. 2 is a timing chart showing signal waveforms of components of the LED drive circuit of FIG. 1.

The timing chart of FIG. 2 shows signal waveforms of components of the LED drive circuit 5 of FIG. 1.

(A) of FIG. 2 shows timings at which the alternating current switch 3 is turned on and off. When the alternating current switch 3 is turned on, and a kind of rectified commercial power source voltage Vin shown in (B) of FIG. 2 is applied to the input side of the LED drive circuit 5, the voltage of a high-voltage VH terminal 42 of the drive IC circuit 4 rises together with the terminal voltage of an input filter capacitor C1 connected to the VH terminal 42. In the drive IC circuit 4, a starting current Ist flows from the VH terminal 42 to the VCC terminal 41 via the built-in start-up circuit 10, and charging of the smoothing capacitor C2 connected to the VCC terminal 41 is started (a timing t1).

At this time, an amount of current equivalent to the amount of current consumed by the drive IC circuit 4 flows to the drive IC circuit 4, but as the voltage (=Vout) of the VCC terminal 41 shown in (C) of FIG. 2 is equal to or lower than the forward voltage (=Vled) of the LEDs 51 to 53, no current flows to the LEDs 51 to 53 which are loads (refer to (E) of FIG. 2).

In a UVLO 11 configuring the drive IC circuit 4, it is necessary that a UVLO cancel voltage Vref1, of threshold voltages, is set to be lower than the forward voltage (=Vled) at which current starts flowing to the LEDs 51 to 53.

In this way, the voltage of the VCC terminal 41, in the same way as the anode voltage of the first LED 51 connected in series, is defined by a direct current output voltage Vout from the smoothing capacitor C2. Because of this, a switch 15 in the start-up circuit 10 is turned off at a timing t2 at which the direct current output voltage Vout reaches the UVLO cancel voltage Vref1, and the starting current flowing from the VH terminal 42 to the VCC terminal 41 is stopped. Further, by a switching operation in the drive IC circuit 4 being started at the timing t2, a constant current control which causes a constant current to flow to the LEDs 51 to 53 is started.

That is, when the direct current voltage Vout reaches the UVLO cancel voltage Vref1, a voltage signal of an OUT terminal 46 of the drive IC circuit 4 repeats H/L, and a switching operation which turns on/off the switching element M1. As power on the primary side is supplied to the secondary side via the transformer T at this time, the terminal voltage of the smoothing capacitor C2 rises further. Subsequently, the LEDs 51 to 53 are lighted at a timing t3 at which the terminal voltage of the smoothing capacitor C2 reaches a voltage VFmin at which a forward current is started to flow to the LEDs 51 to 53.

Also, the terminal voltage of the smoothing capacitor C2 rises until the current flowing to the LEDs 51 to 53 reaches a constant controlled current value (=Io), and after that, the constant current value is maintained. At this time, the voltage (=Vout) of the smoothing capacitor C2 provided on the output side of the transformer T is the sum of an anode-cathode voltage Vled of the LEDs 51 to 53 and the interterminal voltage (=Io·R2) of the current sensing resistor R2. Because of this, the direct current output voltage Vout becomes a constant voltage defined by

*Vled+Io·R2* at a timing t4, while the VCC terminal 41 of the drive IC circuit 4 also becomes the constant voltage (=Vled+Io·R2), and a stable lighting control is carried out by a load current Io.

Next, as the voltage Vin becomes 0V when the alternating current switch 3 is turned off at a timing t5, no more power is supplied from the primary side to the secondary side of the transformer T. Also, in the drive IC circuit 4 of the LED drive circuit 5, no current is supplied from the VH terminal 42 to the VCC terminal 41 of the drive IC circuit 4. Because of this, as the charge of the smoothing capacitor C2 is utilized as a current consumed in the loads and drive IC circuit 4, the voltage of the smoothing capacitor C2 lowers.

When the terminal voltage of the smoothing capacitor C2 becomes equal to or lower than the voltage VFmin at which the forward current is started to flow to the LEDs 51 to 53 (that is, at a timing t6), the LEDs 51 to 53 are completely extinguished. Further, at a timing t7 at which the terminal voltage of the smoothing capacitor C2 becomes equal to or lower than a UVLO voltage Vref2, the switching operation wherein the voltage signal of the OUT terminal 46 of the drive IC circuit 4 repeats H/L is stopped in the drive IC circuit 4. Subsequently, the remaining voltage of the smoothing capacitor C2 is consumed as the current consumed in the drive IC circuit 4, and eventually lowers to 0V.

Next, a description will be given of an LED current and current consumed in the drive IC circuit 4 with respect to the terminal voltage of the smoothing capacitor C2.

Figure 3:
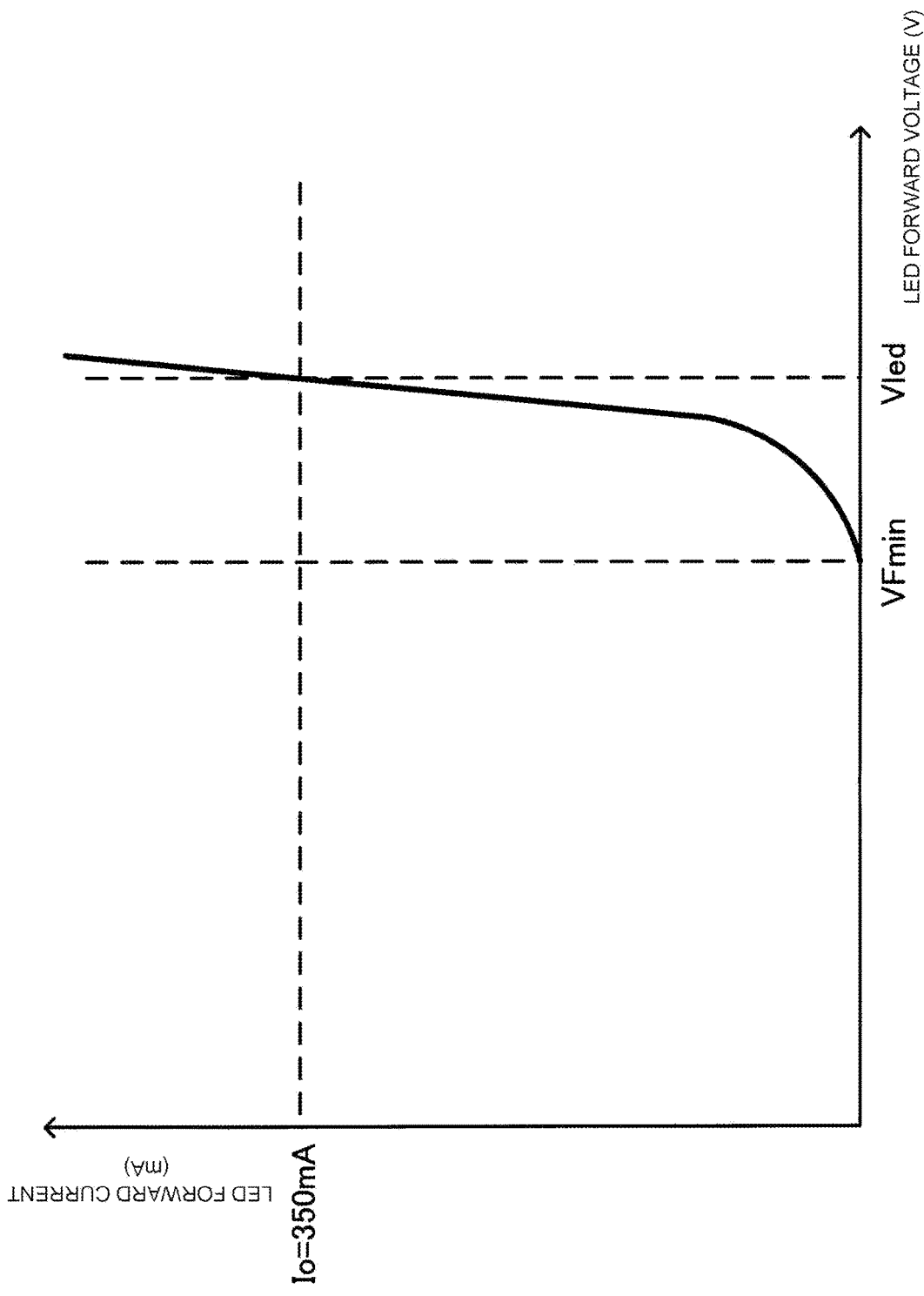
FIG. 3 is a diagram showing forward voltage and current characteristics of a standard blue excitation type white LED.

FIG. 3 is a diagram showing forward voltage and current characteristics of a standard blue excitation type white LED. A forward voltage at which current starts flowing is taken to be 2.8V, while a standard drive current is taken to be 350 mA/3.5V, for each of the LEDs 51 to 53, and a description will be given of an example wherein six LEDs of this kind are used by being connected in series.

The forward voltage starts flowing at 2.8V×6 in series=18V, and rises to 3.5V×6 in series=21V at a standard drive current of Io=350 mA. As the light emitting method of a white LED, there are an RGB type, a blue excitation type, and an ultraviolet excitation type, and the blue excitation type is normally in general use for lighting by an LED.

In the heretofore described embodiment, a blue excitation type using a quasi-white color generated by mixing the blue color of a blue LED and a yellow color emitted from a YAG luminous body by blue color excitation, and an ultraviolet excitation type wherein light is emitted by ultraviolet radiation and the wavelength is converted by R, G, and B fluorescent bodies acting as excitation light sources, are suitable.

Figure 4:
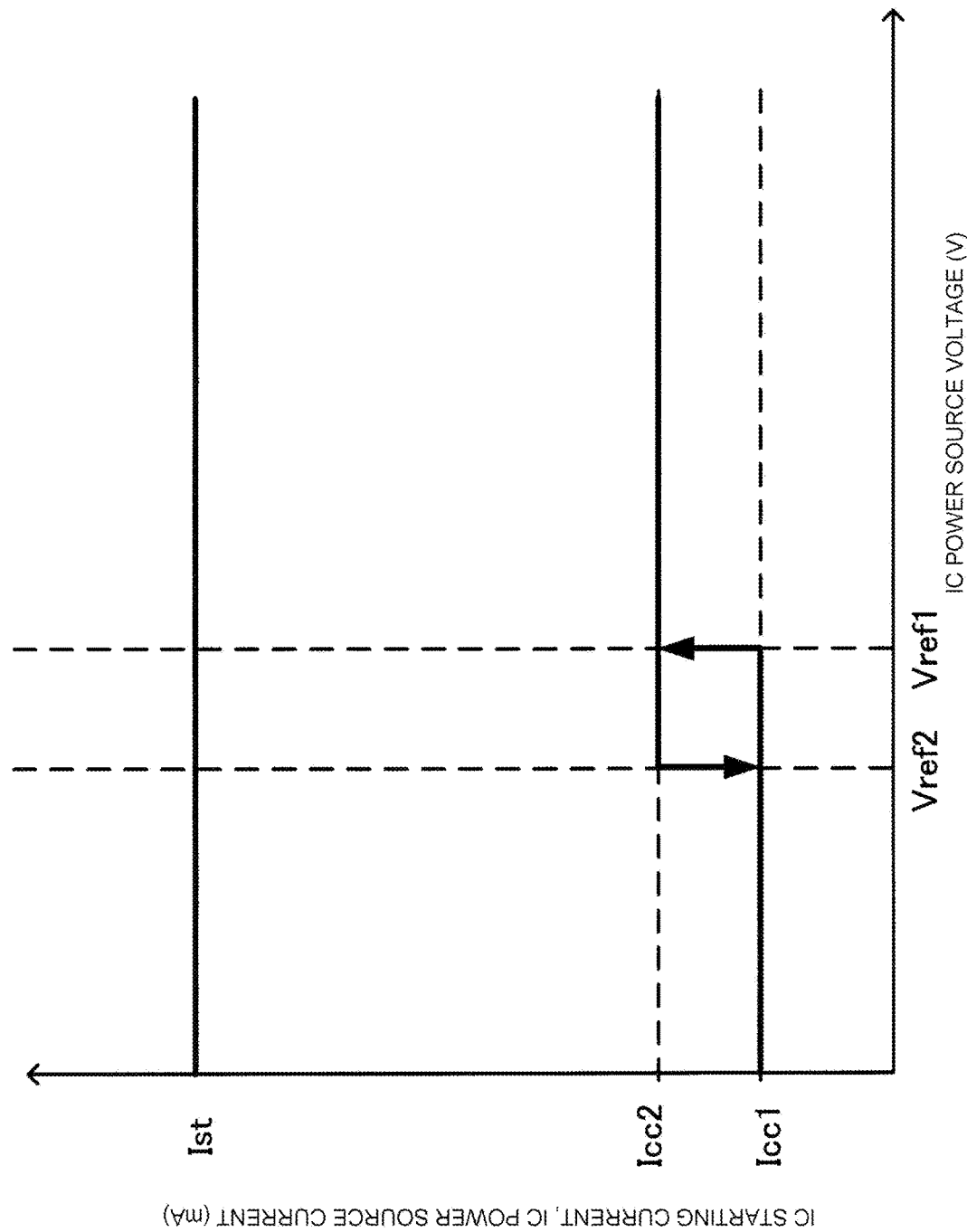
FIG. 4 is a diagram showing power source current characteristics and starting current characteristics with respect to the power source voltage of a drive IC circuit.

FIG. 4 shows power source current (Icc1 and Icc2) characteristics and starting current (Ist) characteristics with respect to the power source voltage of the drive IC circuit 4.

Herein, the UVLO cancel voltage Vref1 is taken to be 12V, and the UVLO voltage Vref2 is taken to be 9V. As the LED forward current is higher than the starting current Ist (=8 mA) flowing from the VH terminal 42 to the VCC terminal 41 with the start-up circuit 10 of the drive IC circuit 4, there is fear that the voltage of the smoothing capacitor C2 does not rise any further when the starting current Ist from the VH terminal 42 flows to the LEDs 51 to 53 before a UVLO cancel. However, as the UVLO cancel voltage Vref1 is 12V, and the voltage at which the forward current starts flowing to the LEDs 51 to 53 is 18V, it does not happen that the starting current Ist from the VH terminal 42 flows to the LEDs 51 to 53 before a switching starts. In other words, when the forward current flows to the LEDs 51 to 53, a low voltage time operation locking by the UVLO circuit has already been cancelled, the switching operation of the LED drive circuit 6 has already been started, and the forward current is being supplied to the LEDs 51 to 53 via the transformer T, meaning that it is possible to stably keep the voltage of the smoothing capacitor C2 at a desired value.

Figure 5:
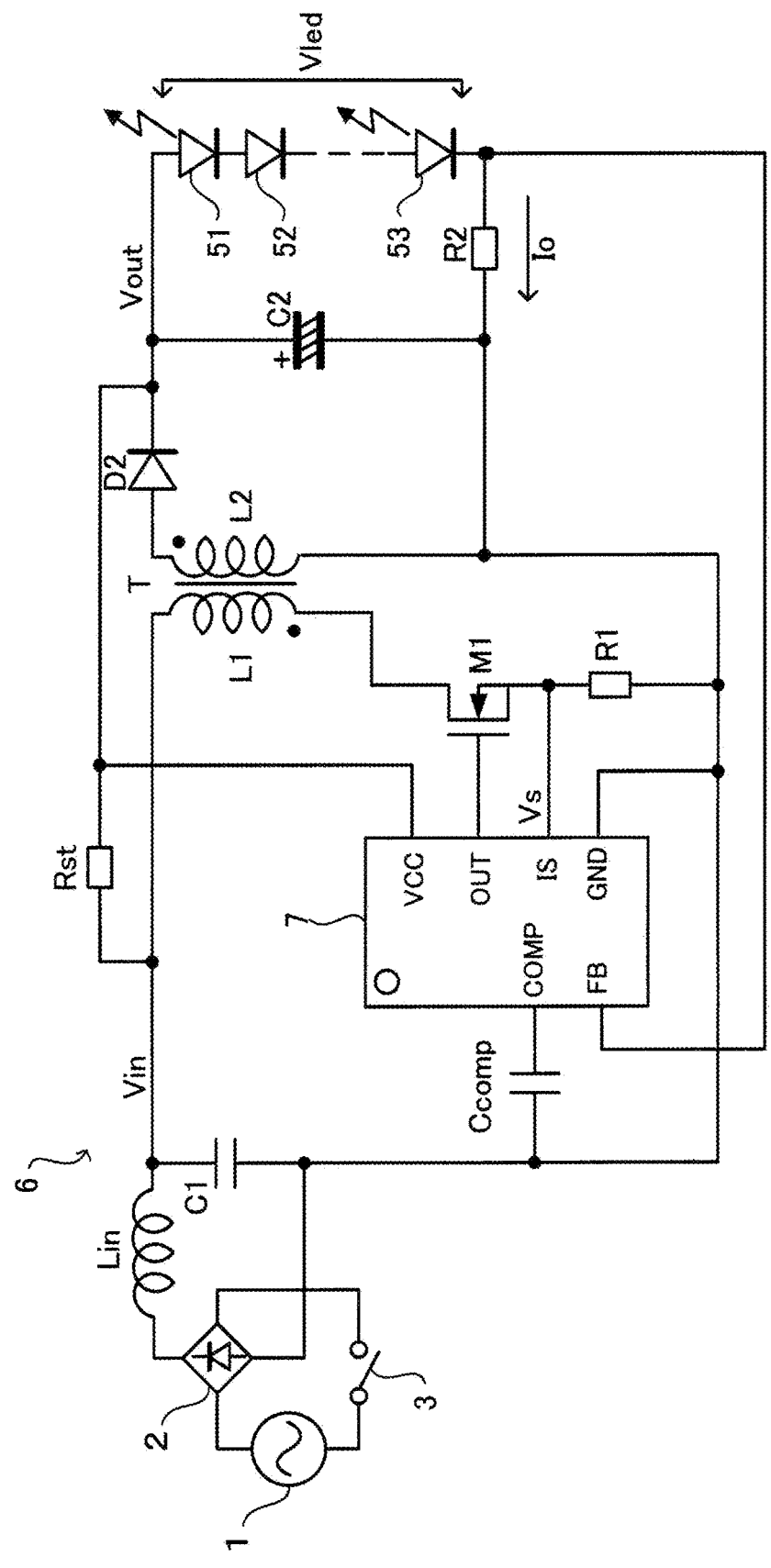
FIG. 5 is a diagram showing an LED drive circuit according to a second embodiment of the invention.

FIG. 5 shows an LED drive circuit 6 according to a second embodiment of the invention. Herein too, circuit components corresponding to those of the heretofore known flyback converter configuration LED drive circuit shown in FIG. 6 are given the same reference numerals and signs, and a description thereof is omitted.

In the LED drive circuit 6, a drive IC circuit without a built-in high-voltage start-up circuit 10 (refer to FIG. 7) is used as the drive IC circuit 7. Because of this, an arrangement is such that a starting current to be supplied to the smoothing capacitor C2 on the secondary side of the transformer T when the alternating current switch 3 is turned on is supplied from a starting resistor Rst provided as a current supply circuit between the smoothing capacitor C2 and the Vin on the primary side.

With the LED drive circuit 6 of the second embodiment, in order to carry out a stable constant voltage control of the LEDs 51 to 53 with the drive IC circuit 7, it is desirable to set a current flowing to the starting resistor Rst to in the order of 10 mA.

The heretofore described simply illustrates the principle of the invention. Furthermore, many modifications and alterations are possible for those skilled in the art and, the invention is not being limited to the heretofore illustrated and described accurate configurations and applications, all corresponding modification examples and equivalents are deemed to be in the scope of the invention according to the attached claims and equivalents thereof.

What is claimed is:

1. An LED drive circuit configured to convert an alternating current voltage of an alternating current power source to a direct current voltage necessary to cause light emitting diodes (LEDs) to emit light, and control lighting of the LEDs, the LED drive circuit comprising:
    a rectifier circuit configured to convert the alternating current power source to a direct current;
    a voltage converter circuit, including
        a transformer including:
            a primary coil on a primary side of the transformer, the primary coil being connected to the direct current voltage converted by the rectifier circuit; and
            a secondary coil on a secondary side of the transformer; and
        a switching element provided on the primary side of the transformer and configured to convert the direct current voltage converted by the rectifier circuit to a desired magnitude,
    wherein the voltage converter circuit is configured to supply the voltage to the LEDs from the second side of the transformer;
    a capacitor connected to a node on a path connecting the secondary coil of the transformer and the LEDs;
    a control circuit provided on the primary side of the transformer and configured to control an on-duty of the switching element of the voltage converter circuit for supplying a predetermined current to the LEDs via the transformer; and
    a current supply circuit connected between the rectifier circuit and the capacitor and configured to supply a starting current to the capacitor,
    wherein the control circuit includes:
        a feedback terminal connected to one of the LEDs and;
        a power supply terminal which is separate and distinct from the feedback terminal, and
    wherein the power supply terminal is connected to one end of the capacitor via the node, so as to drive a current to the power supply terminal using an accumulated charge of the capacitor.

2. The LED drive circuit according to claim 1, wherein the current supply circuit is a start-up circuit provided inside the control circuit.

3. The LED drive circuit according to claim 1, wherein the current supply circuit is a starting resistor.

* * * * *